United States Patent Office 3,585,216
Patented June 15, 1971

3,585,216
PROCESS FOR THE PREPARATION OF BENZOIC ACID LACTONES AND NOVEL INTERMEDIATES THEREFOR
Alexander D. Cross, Mexico City, Mexico, and John H. Fried and Ian T. Harrison, Palo Alto, Calif., assignors to Syntex Corporation, Panama, Panama
No Drawing. Filed July 19, 1966, Ser. No. 566,204
Int. Cl. C07d 9/00
U.S. Cl. 260—345.8
3 Claims This invention relates to a process for the preparation of organic compounds and to certain novel intermediates therefor.

More particularly, this invention is directed at the novel synthesis of benzoic acid lactones represented by the following skeletal formula:

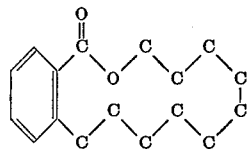

The compounds of this invention demonstrate hormonal properties characteristic of estrogenic agents and are thus useful in the treatment of estrogen deficiencies, in fertility regulation, and in the management of various menstrual disorders.

These compounds are also active anabolic agents and are thus useful in the treatment of debilatory conditions, such as are encountered in advance age, post-operative recuperation, and the like. They are useful as a supplement in livestock feeds to increase consumption with resultant fattening and improved appearance. In addition, the compounds of this invention possess antibiotic, antifungal, and other activities usually associated with certain synthetic or naturally occurring derivatives.

The benzoic acid lactones represented by the above skeletal formula are prepared in accordance herewith via a sequence of steps from a 2-methylbenzoic acid ester, alternatively referred to as an o-toluic acid ester.

In the practice of the principal preferred aspects of this process, the starting 2-methylbenzoic acid ester is reduced to the corresponding alcohol thereof and this compound reacted with an alkyl ester to give the corresponding benzene derivative containing a substituted aliphatic hydrocarbon chain, terminating in an ester grouping, at the alcohol function. Thereafter, this compound containing the 2-methyl group is converted to the corresponding 2-aldehyde thereof and this compound condensed with a triphenylphosphorane adduct terminating in an ester grouping, thus substituting an aliphatic hydrocarbon chain on the benzene ring at the aldehyde function with concomitant formation of double bond unsaturation adjacent to the juncture. Thereafter, the diester is treated with sodium metal in the presence of an organic aprotic solvent, such as xylene, to give the cyclic acyloin derivative. This derivative is then converted to the appropriate keto compound and a second keto group provided therein on the carbon situated between the benzene ring and the oxa function, such as by conventional oxidation after protection of the double bond unsaturation, thus giving the product benzoic acid lactone.

A representative class of the above depicted and described benzoic acid lactones is typified by Formula I as follows:

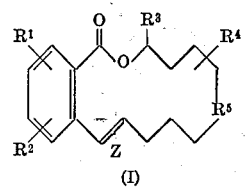

wherein each of $R^1$ and $R^2$, independent of each other, is hydrogen, hydroxy, alkoxy, halo, cyclopentyloxy, tetrahydrofuran-2-yloxy, tetrahydropyran-2-yloxy, hydrocarbon carboxylic acyl or acyloxy of less than 12 carbon atoms or, when taken together, 4,5-benzo;

$R^3$ is hydrogen or (lower)alkyl;

$R^4$ is halo or the group $(C_nH_{2n})$—H in which $n$ has a value of from 0 to 6;

$R^5$ is one of groups

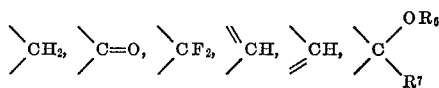

and

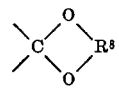

in which $R^6$ is hydrogen, cyclopentyl, tetrahydrofuran-2-yl, tetrahydropyran-2-yl, or hydrocarbon carboxylic acyl of less than 12 carbon atoms; $R^7$ is hydrogen, (lower) alkyl, (lower)alkenyl, (lower)alkynyl, or halo(lower) alkynyl; and $R^8$ is methylene, ethylene, 1,2-propylene, or trimethylene; and Z is a carbon-carbon single bond or a carbon-carbon double bond.

By the term "(lower)alkyl," "(lower)alkenyl," and "(lower)alkynyl" are intended branched or straight chain hydrocarbon groups of six or less carbon atoms. Representations of such (lower)alkyl groups and thus methyl, ethyl, propyl, butyl, pentyl, and hexyl; of such (lower) alkenyl groups are vinyl, propenyl, and the like; of such (lower)alkynyl groups are ethynyl, propynyl, and the like; and of such halo(lower)alkynyl groups are chloroethynyl, and the like.

The hydrocarbon carboxylic acyl and acyloxy groups of the present invention contain less than 12 carbon atoms and may be of a straight, branched, cyclic or cyclic-aliphatic chain structure. These may be saturated, unsaturated or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

One particularly valuable compound of those represented by Formula I above is 2-(6′-keto-10′-hydroxyundec-1′-enyl)-4,6-dihydroxybenzoic acid-10′-lactone represented hereinafter by structural Formula XI. This compound can be prepared by a preferred practice of the instant process as set forth in the following reaction scheme.

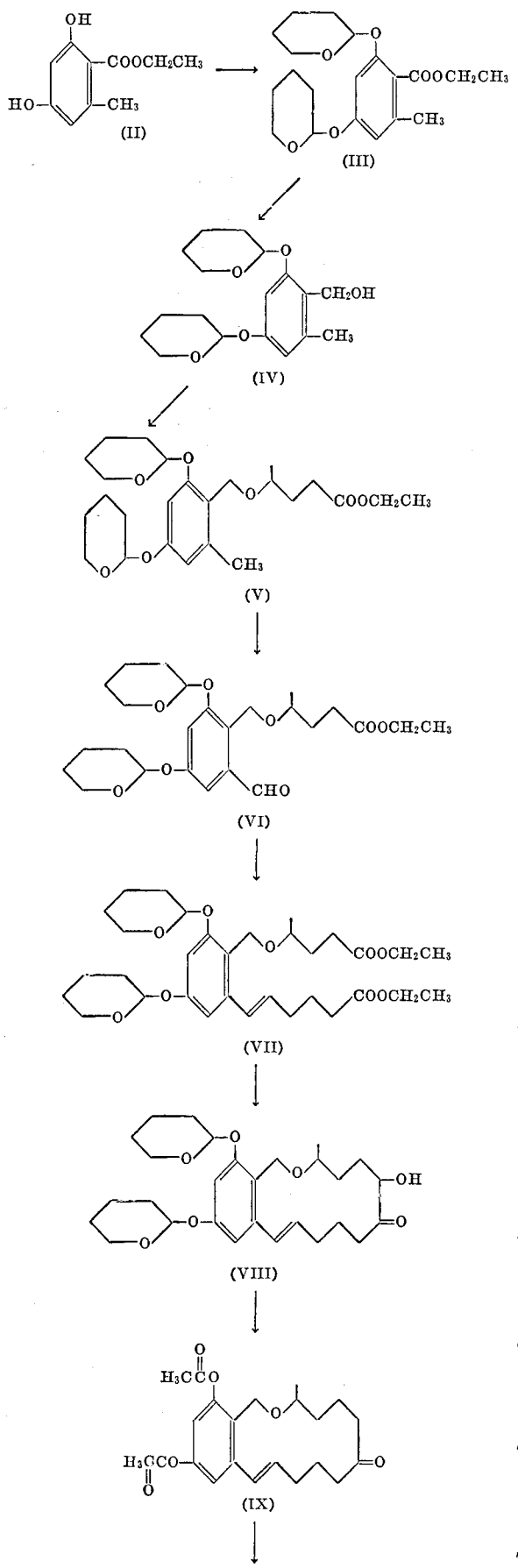

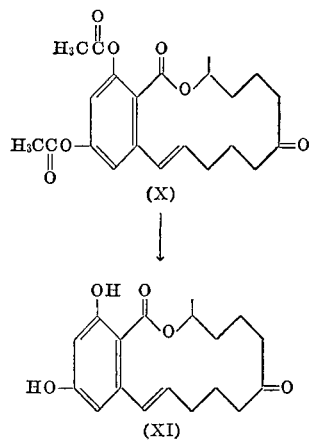

With reference to the above scheme, Compound II is dietherified such as with dihydropyran in the presence of catalyst to give the 2-methyl-4,6-bistetrahydropyran-2'-yloxybenzoic acid Compound III. Alternatively, dihydrofuran or cyclopentyl bromide in the presence of sodium hydride) can be used to give the corresponding bistetrahydrofuran-2-yl and biscyclopentyl ethers. The acid function thereof is then reduced, such as with lithium aluminum hydride to give the corresponding alcohol (IV).

Thereafter, the thus prepared alcohol is reacted with ethyl 4-bromopentanoate or other haloalkanoate in the presence of silver oxide to give the benzyloxyalkanoate derivative (V), which is, in turn, converted to the corresponding aldehyde (VI) upon treatment of the methyl group thereof with chromium trioxide in acetic acid in the presence of acetic anhydride to afford the diacetoxymethyl derivative, followed by mild base hydrolysis.

Condensation of the thus prepared aldehyde compound with the triphenylphosphorane adduct of ethyl pentanoate or other alkanoate in the presence of base such as sodium methoxide provides the 2-alkenoatebenzyloxyalkanoate diester (VII). The triphenylphosphorane adduct of the above procedure is prepared by refluxing 5-chloropentanoate or other haloalkanoate in benzene with excess triphenylphosphine.

The prepared diester (VII) is treated with sodium in xylene solution to give the cyclic acyloin derivative (VIII) comprised of a mixture of the 6'-keto-7'-hydroxy and 6'-hydroxy-7'-keto derivatives. The 6'-keto-4,6-diacetoxy compound (IX) is prepared by a sequence involving, first, standard acetylation, second, treatment with zinc dust in acetic acid, and, third, standard acetylation. A substitutional acylation as the final step provides the corresponding 4,6-diacyloxy compound.

Protection of the 1'-double bond unsaturation of the 2-oxacycloalkenobenzene derivative such as by treatment thereof with one equivalent of bromine to give the 1,2-oxadibromocycloalkanobenzene compound followed by oxidation such as with chromium trioxide in acetic acid or ruthenium tetroxide in dichloromethane affords the corresponding dibromolactone and removal of the bromine atoms by treatment with zinc dust in acetic acid as described above gives the 1,2-(hydroxyalkenyl)-benzoic acid lactone (X). Base hydrolysis thereafter cleaves the acetoxy functions thus providing product 2-(6'-keto-10'-hydroxyundec-1'-enyl) - 4,6 - dihydroxybenzoic acid-10'-lactone (XI).

The novel diester compound represented by Formula VII above, in addition to its usefulness as an intermediate as previously indicated in detail, also exhibits biological activity and it can be isolated from the reaction process and thus used. A representative group of these novel and biologically useful compounds, by reference to the product compounds of this invention as illustrated by Formula I above, are represented by the following structural formula:

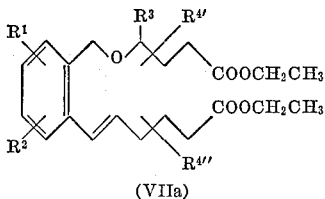

(VIIa)

wherein each of $R^1$, $R^2$, and $R^3$ is as defined above for the compounds of Formula I and each of $R^{4'}$ $R^{4''}$, independent of each other, has the same meaning as the definition of $R^4$ for the compounds of Formula I, provided that at least one of $R^{4'}$ and $R^{4''}$ is hydrogen. These compounds exhibit similar activities as those described hereinabove for the product compounds of this invention. In addition, these compounds are useful as vasodepressors and exhibit smooth muscle stimulating activity similar to that of prostaglandins. Base hydrolysis of the above compounds provides the corresponding diacids thereof which can be further modified as described hereinafter. Similarly, acid hydrolysis thereof provides the corresponding phenolic dihydroxy derivatives which also can be further modified as hereinafter set forth. It will be understood that other corresponding diesters, such as the corresponding methyl diesters, are also within the scope of this invention.

The above described procedures of the instant process can be similarly followed in the preparation of the other 2-(6'-keto-10'-hydroxyundec-1'-enyl) - benzoic acid lactones represented by Formula I above utilizing the requisite starting compounds. Thus, for example, by utilizing the ethyl ester of o-toluic acid as a starting compound in the instant process, 2 - (6'-keto-10'-hydroxyundec-1'-enyl)-benzoic acid-10'-lactone is prepared.

The substituents represented by $R^3$ and $R^4$ are preferably provided by utilizing the appropriately substituted starting compounds. Thus, by employing ethyl 4-bromohexanoate and ethyl 4-bromoheptanoate for ethyl 4-bromopentanoate in the preparation of Compound V, the corresponding compounds, in which $R^3$ is ethyl and propyl, are respectively obtained. Similarly, by preparing and utilizing a branched chain alkanoate in the preparation of Compound V and/or a branched chain triphenylphosphorane alkanoate in the preparation of Compounds VII, the corresponding compounds containing appropriate $R^4$ ($R^{4'}$, $R^{4''}$) substituents are prepared. In addition, the use of a halogenated benzoic acid starting compound gives the corresponding compounds containing halogen represented by groups $R^1$ and $R^2$. By starting with ethyl 3-methyl-2-naphthoate (prepared upon esterification of 3-methyl-2-naphthoic acid) in lieu of Compound II, the corresponding 4,5-benzo derivative is prepared, that is, the compounds in which $R^1$ and $R^2$, taken together, is 4,5-benzo.

The substituents and functional groupings represented by $R^1$, $R^2$, and $R^5$ in Formula I can be present in the starting compounds as indicated above and are preferably provided at the end of the principal reaction sequence such as by treating Compound XI with etherification agents to form various 4,6-diethers, for example, methoxy, ethoxy, cyclopentyloxy, tetrahydrofuran-2-yloxy, tetrahydropyran - 2-yloxy, and the like and esterification agents giving various 4,6-diesters, for example, acetoxy, propionoxy, adamantoyloxy, and the like.

The $R^5$ substituents in the product compounds are provided by reducing the keto function at position 6' of the molecule to give the corresponding alcohol or treating it with an alkyl-, alkenyl-, or alkynyllithium or, alternatively, an alkyl-, alkenyl-, or alkynylmagnesium halide to provide the corresponding 6'-aliphatic-6'-hydroxy derivatives. The resultant hydroxy group in each instance can be etherified and esterified giving the corresponding ethers and esters thereof. The 6'-keto can be removed such as by converting it to the corresponding 6',6'-thioketal and cleaving this with acid, thus giving the 6'-unsubstituted compound. Reduction of the 6'-keto, such as with sodium borohydride gives the corresponding 6'-alcohol which may be etherified or esterified as described above or, alternatively, treated with p-toluenesulfonyl chloride in pyridine solution to give a mixture of 5'- and 6'-unsaturated derivatives, which can be separated such as by selective crystallization from ethanol. Treatment of the 6'-keto with sulfur tetrafluoride in dioxane gives the corresponding 6',6'-difluoro compound.

Further, the above mentioned keto group can be converted to the corresponding oxime, such as by treatment with hydroxylamine hydrochloride; a hydrazone such as with hydrazine itself or a substituted hydrazine, for example, methylhydrazine, phenylhydrazine, 2,4-dinitrophenylhydrazine, semicarbazide, and the like; an acetal with ethylene glycol, trimethylene glycol, and the like; imines, such as are provided by reaction with methylamine, dimethylamine, ethylamine, aniline, benzylamine, and the like; amines by reduction of the corresponding imine, as well as various other groups known to one skilled in the art. The keto function can also be subjected to a Beckmann rearrangement to give the corresponding lactam.

In addition, certain other modifications can be made to the thus prepared product compound such as selective hydrogenation of one or more unsaturated linkages either in the benzoic acid ring or at position 1',2' (Z) such as by utilizing a poisoned hydrogenation catalyst.

Illustrative 1,2-benzoic acid lactones of the above skeletal formula which are thus prepared by following one or more of the above outlined procedures using the requisite starting compounds or treatment of the product Compound XI hereof are as follows:

2-(10'-hydroxyundec-1'-enyl)-4,6-dihydroxybenzoic acid-10'-lactone, 2-(6',10'-dihydroxyundec-1'-enyl)-4,6-dihydroxybenzoic acid-10'-lactone, 2-(10'-hydroxyundec-1',5'-dienyl)-4,6-dihydroxybenzoic acid-10'-lactone, 2-(10'-hydroxyundec-1',6'-dienyl)-4,6-dihydroxybenzoic acid-10'-lactone, 2-(6'-keto-10'-hydroxyundecanyl)-4,6-dihydroxybenzoic acid-10'-lactone, 2-(6'-keto-10'-hydroxyundec-1'-enyl)-4,6-dimethoxybenzoic acid-10'-lactone, 2-(6'-keto-10'-hydroxyundec-1'-enyl)-4,6-diacetoxybenzoic acid-10'-lactone, 2-(6'-keto-10'-hydroxyundec-1'-enyl)-4,6-biscyclopentyloxybenzoic acid-10'-lactone, 2-(6'-keto-10'-hydroxyundec-1'-enyl)-4,6-bistetrahydropyran-2'-yloxbenzoic acid-10'-lactone, 2-(6'-keto-10'-hydroxyundec-1'-enyl)-4,6-tetrahydrofuran-2'-yloxybenzoic acid-10'-lactone, 2-(6'-keto-10'-hydroxyundec-1'-enyl)-4,5-benzobenzoic acid-10'-lactone, 2-(6'-ethynyl-6',10'-dihydroxyundec-1'-enyl)-4,6-dihydroxybenzoic acid-10'-lactone, 2-(6'-methyl-6',10'-dihydroxyundec-1'-enyl)-4,6-dihydroxybenzoic acid-10'-lactone, 2-(6'-ethynyl-6'-tetrahydropyran-2''-yloxy-10'-hydroxyundec-1'-enyl)-4,6-bistetrahydropyran-2'-yloxybenzoic acid-10'-lactone, 2-(6'-acetoxy-6'-ethynyl-10'-hydroxyundec-1'-enyl)-4,6-diacetoxy-benzoic acid-10'-lactone, 2-(6'-acetoxy-10'-hydroxyundec-1'-enyl)-4,6-dihydroxybenzoic acid-10'-lactone, 2-(6'-tetrahydropyran-2''-yloxy-10'-hydroxyundec-1'-enyl)-4,6-bistetrahydropyran-2'-yloxybenzoic acid-10'-lactone, 2-(6'6'-difluoro-10'-hydroxy-1'-enyl)-4,6-dihydroxybenzoic acids-10'-lactone, 2-(6',6'-bisethylenedioxy-10'-hydroxyundec-1'-enyl)-4,6-dihydroxybenzoic acid-10'-lactone, and
2-(6'-keto-10'-hydroxydodec-1'-enyl)-4,6-dihydroxybenzoic acid1-10'-lactone.

It will be understood that various substituent combinations not included in the above partial list, but covered by the scope hereof, are similarly prepared in accordance with the above discussion and hereinafter contained examples.

The products of this invention can be provided via an alternative process. According to this embodiment, ethyl 2 - diacetoxymethyl - 4,6 - diacetoxybenzoate (prepared from ethyl 2-methyl-4,6-dihydroxybenzoate by, first diacetylation of the 4,6-hydroxy groups and, second, acetylation of the 2-methyl group under oxidative conditions) is used as a starting compound and converted to the corresponding ethyl 2-ethylenedioxymethyl-4,6-bistetrahydropyran - 2' - yloxybenzoate via conventional ketal formation and etherification with dihydropyran. The ester function is then reduced to give the corresponding alcohol. The thus prepared alcohol is treated as described above for the preparation of Compound V and the thus prepared derivative, thereafter treated with acid to cleave the ketal group and subsequently re-etherified with dihydroyran to give Compound VI, illustrated above. Thereafter, Compound VI is treated as described above giving product Compound XI.

Another method of preparing the instant compounds involves the use of, first, a haloalkanoate which contains one additional carbon atom in the aliphatic chain between the ester and halo functions, such as, for example, 5-bromohexanoate, in the preparation of Compound V and, second, an alkanoate which contains one less carbon atom in the aliphatic chain such as, for example, 4-chlorobutanoate, in the preparation of Compound VII. Thus prepared thereby is the cyclic acyloin product which contains the mixture of 5-keto-6-hydroxy and 5-hydroxy-6-keto derivatives in lieu of Compound VIII. The 6-keto compound is similiary recovered as described above.

The following examples illustrate the manner by which this invention can be practiced, but it will be understood that they are not to be construed as limitations upon the overall scope hereof.

EXAMPLE 1

Ten milliliters of dihydropyran are added to a solution of 1 g. of ethyl 2-methyl-4,6-dihydroxybenzoate in 20 ml. of benzene. About 1 ml. is removed by distillation to eliminate the presence of mositure and 0.4 g. of p-toluenesulfonyl chloride is added to the cooled solution. This mixture is allowed to stand at room temperature for 4 days, after which time 10 ml. of water is added and the mixture stirred for 1 hour at room temperature. The mixture is then washed with aqueous sodium carbonate solution and water, dried, and evaporated to yield ethyl 2-methyl-4,6-bistetrahydropyran-2'-yloxybenzoate, which is recrystallized from pentane.

A solution of 1 g. of lithium aluminum hydride and 2 g. of ethyl 2-methyl-4,6-bistetrahydropyran-2'-yloxybenzoate in 150 ml. of tetrahydrofuran is stirred for 1 hour at room temperature. To the mixture is, thereafter, cautiously added 10 ml. of ethyl acetate and 7 ml. of water. The mixture is filtered and the solid thus collected is washed with hot ethyl acetate. The combined organic solutions are then evaporated to yield 2-methyl-4,6-bistetrahydropyran-2'-yloxyphenylcarbinol which is further purified upon recrystallization from acetone:hexane.

A solution of 1 g. of 2-methyl-4,6-tetrahydropyran-2'-yloxyphenylcarbinol, 1 g. of ethyl 4-bromopentanoate, and 10 g. of silver oxide in 50 ml. of dimethyl formamide is stirred at room temperature for 24 hours. Thereafter, 500 ml. of chloroform are added, the solution filtered, and the filtrate evaporated to yield 1-(1'-carbethoxy-3'-methylprop-3'-yloxymethyl)-2 - methyl-4,6-bistetrahydropyran-2'-yloxybenzene, which is further purified upon chromatography on silica gel.

To a solution of one equivalent of chromium trioxide in 30 ml. of an acetic acid-acetic anhydride mixture (1:1 by weight) is added 1 g. of 1-(1'-carbethoxy-3'-methylprop-3'-yloxymethyl)-2-methyl - 4,6-bistetrahydropyran-2'-yloxybenzene. After standing for 3 hours at 0° C., the solid which forms is collected by filtration, washed with water, and recrystallized from ethanol to yield 1-(1'-carbethoxy-3'-methylprop-3' - yloxymethyl)-2-diacetoxymethyl-4,6-bistetrahydropyran-2'-yloxybenzene.

One gram of 1-(1'-carbethoxy-3'-methylprop-3'-yloxymethyl)-2-diacetoxymethyl - 4,6 - bistetrahydropyran-2'-yloxybenzene is allowed to stand at room temperature for 15 hours with 2 g. of potassium bicarbonate in 15 ml. of water and 100 ml. of methanol. At the end of this time, the methanol is evaporated under reduced pressure and the residue is extracted with ethyl acetate and water. Evaporation of the ethyl acetate from these extracts yields 1(1'-carbethoxy-3'-methylprop - 3' - yloxymethyl)-4,6-bistetrahydropyran-2'-yloxybenzene-2-al, the 2-aldehyde of 1-(1'-carbethoxy-3'-methylprop-3'-yloxymethyl)-4,6-bistetrahydropyran-2'-yloxybenzene, which is collected by filtration and recrystallized from acetone:hexane.

To a solution of 1 g. of triphenylphoshine in 30 ml. of benzene is added 1 g. of 5-chloropentanoate and the mixture is refluxed for 1 hour. The reaction mixture is thereafter filtered and the insoluble material is recovered and added to 50 ml. of tetrahydrofuran.

To the solution thus prepared is added 1 g. of 1-(1'-carbethoxy-3'-methylprop-3'-yloxymethyl)-4,6 - bistetrahydropyran-2'-yloxybenzene-2-al in 25 ml. of dimethylformamide containing 150 mg. of sodium methoxide. After standing for 24 hours at room temperature, the solution is heated to 100° C. for 1 hour. Thereafter, 50 ml. of water are added to the reaction mixture and it is then extracted with successive portions of ether and the ether extracts chromatographed on silica gel, thus giving 1-(1'-carbethoxy-3'-methylprop-3'-yloxymethyl)-2-(1'-carbethoxypent-4'-enyl)-4,6 - bistetrahydropyran-2'-yloxybenzene.

EXAMPLE 2

To a solution of 1 g. 1-(1'-carbethoxy-3'-methylprop-3'-yloxymethyl) - 2 - (1'-carbethoxypent-4'-enyl)-4,6-bistetrahydropyran-2'-yloxybenzene in 50 ml. of xylene is added 1 g. of powdered sodium metal and the mixture is thereafter heated at 90° C. for 30 minutes. The reaction mixture is allowed to cool and 5 ml. of ethanol are cautiously added followed by 10 ml. of water. The reaction mixture is then extracted with successive portions of ether and the ether extracts dried and evaporated to yield a mixture of 1,2-(6'-keto-7'-hydroxy-10'-methyl-10'-oxacycloundec-1'-eno) - 4,6 - bistetrahydropyran-2'-yloxybenzene and the corresponding 6'-hydroxy-7'-keto derivative thereof.

A mixture of 1 g. of a mixture of 1,2-(6'-keto-7'-hydroxy-10'-methyl-10'-oxacycloundec-1'-eno) - 4,6 - bistetrahydropyran-2'-yloxybenzene and 1,2-(6'-hydroxy-7'-keto-10'-methyl-10'-oxacycloundec-1'-eno) - 4,6-bistetrahydropyran-2'-yloxybenzene, 4 ml. of pyridine, and 2 ml. of acetic anhydride is allowed to stand at 20° C. for 15 hours. The mixture is then poured into ice water and the solid which forms is collected by filtration, washed with water and dried.

To a solution of 1 g. of the solid thus obtained in 50 ml. of acetic acid are added 10 g. of zinc dust and the resultant mixture is stirred for 24 hours at room temperature. Thereafter, the reaction mixture is filtered and to the filtrate is added water and the mixture extracted with successive portions of ether. The ether extracts are evaporated to give a second solid.

A mixture of 1 g. of the second solid thus obtained, 4 ml. of pyridine, and 2 ml. of acetic anhydride is allowed to stand at room temperature for 15 hours. The mixture is then poured into ice water and the solid which forms is collected by filtration, washed with water and dried to yield 1,2-(6'-keto-10'-methyl-10'-oxacycloundec-1'-eno)-4,6-diacetoxybenzene, which is further purified through recrystallization from acetone:hexane.

To a solution of 1 g. of 1,2-(6'-keto-10'-methyl-10'-oxacycloundec-1'-eno)-4,6-diacetoxybenzene in 10 ml. of chloroform is added, over a 5-minute period with continuous stirring, a dilute solution of one chemical equivalent (based on the amount of starting benzene compound) of bromine in chloroform at −20° C. After being allowed to stand at room temperature for 20 minutes, the mixture is treated with 10 ml. of 5% aqueous sodium carbonate solution and extracted with chloroform. The chloroform extracts are washed with water to neutrality, dried over sodium sulfate, and evaporated to dryness to yield 1,2-(1',2'-dibromo-6'-keto-10'-methyl-10'-oxacycloundecano)-4,6-diacetoxybenzene which is recrystallized from acetone:hexane.

To a solution of 1 g. of 1,2-(1',2'-dibromo-6'-keto-10'-methyl-10'-oxacycloundecano) - 4,6-diacetoxybenzene in 25 ml. of acetic acid is added 1 g. of powdered chromium trioxide and the resultant mixture is stirred at room temperature for 5 hours. Thereafter, 10 ml. of water are added and the mixture extracted with successive portions of ether which are washed with water, dried over sodium sulfate, and evaporated to yield 2-(1',2'-dibromo-6'-keto-10'-hydroxyundecanyl)-4,6 - diacetoxybenzoic acid-10'-lactone.

To a solution of 1 g. of 2-(1',2'-dibromo-6'-keto-10'-hydroxyundecanyl)-4,6-diacetoxybenzoic acid-10'-lactone in 50 ml. of acetic acid are added 10 g. of zinc dust and the resultant mixture is stirred at room temperature for 30 minutes. Thereatfer, the reaction mixture is filtered, water is added to the filtrate and it is extracted with successive portions of ether, which are washed with water, dried, and evaporated to yield 2-(6'-keto-10'-hydroxyundec-1'-enyl)-4,6-diacetoxybenzoic acid-10'- lactone.

A solution of 1 g. of 2-(6'-keto-10'-hydroxyundec-1'-enyl) - 4,6 - diacetoxybenzoic acid - 10' - lactone in 100 ml. of ethanol containing 1 g. of sodium bicarbonate and 10 ml. of water is refluxed for 4 hours. Thereafter, 10 ml. of water are added and the mixture extracted with ether and the ether extracts washed with water, dried, and evaporated to yield 2 - 6' - keto - 10' - hydroxyundec - 1'-enyl) - 4,6 - dihydroxybenzoic acid-10'-lactone, which is further purified upon recrystallization from acetone:hexane.

EXAMPLE 3

By substituting ethyl 4-bromohexanoate and ethyl 4-bromoheptanoate for ethyl 4-bromopentanoate in the procedure set forth in the third paragraph of Example 1, there are respectively obtained via the procedures terminating in Example 2 above, 2-(6'-keta-10'-hydroxydodec-1'-enyl)-4,6-dihydroxybenzoic acid-10'-lactone and 2-(6'-keto-10'-hydroxy - tridec - 1' - enyl) - 4,6 - dihydroxybenzoic acid-10'-lactone. Similarly, there are respectively obtained thereby, as products of Example 1 hereof, 1-(1'-carbethoxy - 3' - methylbut - 3' - yloxymethyl) - 2 - (1'-carbethoxy - 3' - methylpent - 4' - enyl) - 4,6 - bistetrahydropyran - 2' - yloxybenzene and 1' - (1' - carbethoxy-3' - methylpent - 3' - yloxymethyl) - 2 - (1' - carbethoxypent - 4' - enyl) - 4,6 - bistetrahydropyran - 2' - yloxybenzene.

By starting with ethyl 3-methyl-2-naphthoate as a starting compound in Example 1 there is obtained as a product thereof 1-(1'-carbethoxy-3'-methylprop-3'-yloxymethyl) - 2 - (1' - carbethoxypent - 4' - enyl) - 4,5-benzobenzene and as a product of Example 2 above, 2-6'-keto-10' - hydroxyundec - 1' - enyl) - 4,5 - benzobenzoic acid-10'-lactone. Similarly, by utilizing ethyl 2-methylbenzoic acid as a starting compound in Example 1, there is obtained as a product thereof, 1-(1'-carbethoxy - 3' - methyl prop-3' - yloxymethyl) - 2 - (1' - carbethoxypent - 4' - enyl)- benzene and as a product of Example 2 hereof, 2-'6'-keto - 10' - hydroxyundec - 1' - enyl) - benzoic acid-10'-lactone.

EXAMPLE 4

To a suspension of 1 g. of 2-6'-keto-10'-hydroxyundec-1' - enyl) - 4,6 - dihydroxybenzoic acid - 10' - lactone in 25 ml. of acetone is added a solution of 0.5 g. of potassium hydroxide in 37.5 ml. of water and the stirred mixture is heated dropwise with 10 ml. of methyl sulfate. The mixture is stirred for an additional 45 minutes and then poured into dilute hydrochloric acid. The solid which forms is collected by filtration and dried to yield 2-(6'-keto-10'-hydroxyundec - 1' - enyl) - 4,6 - dimethoxybenzoic acid-10'-lactone which is recrystallized from chloroform: methanol.

The following procedures illustrate methods by which various ester and ether groups may be inserted on the benzoic acid ring.

A mixture of 1 g. of 2-(6'-keto-10'-hydroxyundec-1'-enyl) - 4,6 - dihydroxybenzoic acid - 10' - lactone, 1 g. of p-toluene-sulfonic acid monohydrate, 75 ml. of acetic acid and 50 ml. of acetic anhydride is allowed to stand at room temperature for 24 hours, and then poured into water and stirred. This mixture is then extracted with methylene chloride and these extracts are dried and evaporated to yield 2 - (6' - keto - 10' - hydroxyundec - 1' - enyl) - 4,6-diacetoxybenzoic acid - 10' - lactone which is recrystallized from acetone:ether.

Similarly, the corresponding 4,6-propionoxy derivative is prepared upon substitution of propionic anhydride for acetic anhydride in the above procedure.

A mixture of 1 g. of 2-(6'-keto-10'-hydroxyundec-1'-enyl)-4,6 - dihydroxybenzoic acid - 10' - lactone in 8 ml. of pyridine and 5 ml. of adamantoyl chloride is heated at steam bath temperatures for 1 hour. The mixture is then poured into ice water and the solid which forms is collected by filtration, washed with water and dried to yield 2-(6'-keto - 10' - hydroxyundec - 1' - enyl) - 4,6 - bisadamantoyloxybenzoic acid-10'-lactone which is further purified through recrystallization from methylene chloride:hexane.

Five milliliters of dihydropyran are added to a solution of 1 g. of 2 - (6'-keto-10'-hydroxyundec-1'-enyl)-4,6-dihydroxybenzoic acid-10'-lactone in 15 ml. of benzene. About 1 ml. is removed by distillation to removed moisture and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 2 - (6' - keto - 10' - hydroxyundec - 1' - enyl) - 4,6 - bistetrahydropyran - 2' - yloxybenzoic acid - 10' - lactone which is recrystallized from pentane.

To a solution of 1 g. of 2 - (6' - keto - 10' - hydroxyundec - 1' - enyl) - 4,6 - dihydroxybenzoic acid - 10' - lactone in 20 ml. of benzene, 20 ml. of dihydrofuran is added. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutral, dried over anhydrous magnesium sulfate, and evaporated to dryness under reduced pressure. The oily residue crystallized on the addition of ether to yield the 2 - (6' - keto - 10' - hydroxyundec -1'-enyl) - 4,6 - bistetrahydrofuran - 2' - yloxybenzoic acid-10'-lactone.

A solution of 5 g. (0.016 mole) of 2 - (6' - keto - 10'-hydroxyundec - 1' - enyl) - 4,6 - dihydroxybenzoic acid-10'-lactone in 50 ml. of benzene is heated to reflux and about 2 ml. removed by distillation to eliminate the presence of moisture. The mixture is cooled to room temperature and then two chemical equivalents of sodium hydride is added followed by the dropwise addition of two chemical equivalents of cyclopentyl bromide in 20 ml. of benzene over a period of 20 minutes. The mixture is allowed to reflux for 20 hours after which time the precipitate of sodium bromide is removed by filtration and the organic phase is dried and evaporated to yield 2-(6'-keto-10' - hydroxyundec-1'-enyl)-4,6-biscyclopentyloxybenzoic acid-10'-lactone is recrystallized from acetone:hexane.

EXAMPLE 5

A solution of 2.0 g. of 2-(6'-keto-10'-hydroxyundec-1'-enyl)-4,6-dihydroxybenzoic acid-10'-lactone in 100 ml. of ethyl acetate is hydrogenated with 0.1 g. of palladium-on-carbon catalyst until the theoretical amount of hydrogen is consumed. The catalyst is removed by filtration and the filtrate is evaporated to dryness to yield 2-(6'-keto-10'-hydroxyundecanyl)-4,6-dihydroxybenzoic acid-10'-lactone which is further purified by recrystallization from acetone:hexane.

EXAMPLE 6

A solution of 1 g. of sodium borohydride in 3 ml. of water is added to an ice-cooled solution of 1 g. of 2-(6'-keto-10'-hydroxyundec-1'-enyl) - 4,6 - dihydroxybenzoic acid-10'-lactone in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 2-(6',10'-dihydroxyundec-1'-enyl) - 4,6 - dihydroxybenzoic acid-10'-lactone which is further purified by recrystallization from acetone:hexane.

The thus provided 6'-hydroxyl group is etherified and esterified as described above in Example 4 to give the corresponding 6'-ethers and -esters.

EXAMPLE 7

A solution of 5 g. of 2-(6'-keto-10'-hydroxyundec-1'-enyl)-4,6-dihydroxybenzoic acid-10'-lactone in 250 ml. of thiophene-free benzene is treated with an ethereal solution of 3 chemical equivalents (based upon the amount of lactone) of methylmagnesium bromide. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 2-(6'-methyl-6'-10'-dihydroxyundec-1'-enyl)-4,6-dihydroxybenzoic acid-10'-lactone which is recrystallized from methylene chloride:hexane.

To a stirred solution of 2 g. of 2-(6'-keto-10'-hydroxyundec-1'-enyl)-4,6-dihydroxybenzoic acid-10'-lactone in 250 ml. of absolute ether is added in a dropwise fashion and under nitrogen, an ethereal solution of 3 chemical equivalents (based upon the amount of lactone) of ethyllithium. The mixture is then stirred for 48 hours at room temperature, poured into water, acidified with hydrochloric acid and stirred vigorously for 1 hour. The ethereal phase is separated, washed with water to neutrality, dried over sodium sulfate and evaporated to dryness to yield 2-(6'-ethyl-6',10'-dihydroxyundec-1'-enyl) - 4,6-dihydroxybenzoic acid-10'-lactone which is further purified through recrystallization from acetone:hexane.

To a solution of 1 g. of lithium aluminum hydride in 100 ml. of anhydrous tetrahydrofuran is continuously bubbled a slow current of purified acetylene. Thereafter, 1 g. of 2-(6'-keto-10'-hydroxyundec-1'-enyl)-4,6-dihydroxybenzoic acid-10'-lactone in 10 ml. of tetrahydrofuran is added and the reaction mixture stirred at room temperature for 4 hours. Eight milliliters of water are then added and the mixture stirred for 30 minutes. The mixture is then filtered and the organic filtrate evaporated to yield 2-(6'-ethynyl-6',10'-dihydroxyundec-1'-enyl) - 4,6 - dihydroxybenzoic acid-10'-lactone which is recrystallized from acetone:hexane.

The 6'-hydroxyl groups which are provided via the procedures set forth in this example above are esterified and etherified in a similar manner as described in Example 4 above, thus giving the following representative compounds thereof:

2-(6'-ethynyl-6'-tetrahydropyran-2''-yloxy-10'-hydroxyundec-1'-enyl)-4,6-bistetrahydropyran-2'-yloxybenzoic acid-10'-lactone,
2-(6'-acetoxy-6'-ethynyl-10'-hydroxyundec-1'-enyl)-4,6-acetoxybenzoic acid-10'-lactone,
2-(6'-propionoxy-6'-methyl-10'-hydroxyundec-1'-enyl)-4,6-propionoxybenzoic acid-10'-lactone, and
2-(6'-propionoxy-6'-ethyl-10'-hydroxyundec-1'-methyl)-4,6-propionoxybenzoic acid-10'-lactone.

Similarly, by treating a 4,6-diesterified or 4,6-dietherified compound as described in the instant example there are obtained, for example, 2-(6'-ethynyl-6'-tetrahydropyran-2''-yloxy - 10' - hydroxyundec-1'-enyl)-4,6-diacetoxybenzoic acid-10'-lactone and 2-(6'-methyl-6'-propionoxy-10'-hydroxyundec-1'-enyl) - 4,6 - bistetrahydropyran-2'-yloxybenzoic acid-10'-lactone.

EXAMPLE 8

A mixture of 1 g. of 2-(6'-keto-10'-hydroxyundec-1'-enyl)-4,6-dihydroxybenzoic acid-10'-lactone in 50 ml. of warm acetic acid is treated with 1 ml. of ethanedithiol in a solution of 1 g. of p-toluenesulfonic acid in 10 ml. of acetic acid. The mixture is kept at room temperature for 17 hours after which time a crystalline solid separates. This solid is recrystallized from acetone to give 2-(6',6'-ethanedithio-10'-hydroxyundec-1'-enyl) - 4,6-dihydroxybenzoic acid-10'-lactone.

Twenty grams of standard Raney nickel catalyst is refluxed with stirring for 2 hours in 60 ml. of acetone. A solution of 2 g. of 2-(6',6'-ethanedithio-10'-hydroxyundec-1'-enyl)-4,6-dihydroxybenzoic acid-10'-lactone in 40 ml. of acetone and 40 ml. of water is added and the refluxing is continued for 1 hour. The reaction mixture is filtered and the filtrate concentrated in vacuum and extracted with ether. The ethereal layer is successively washed with 100 ml. of cold 1% sodium hydroxide, 100 ml. of 1 N hydrochloric acid, and finally 300 ml. of water, dried over sodium sulfate and evaporated to dryness to give 2-(10'-hydroxyundec-1'-enyl) - 4,6 - dihydroxybenzoic acid-10'-lactone.

EXAMPLE 9

A solution of 1 g. of 2-(6',10'-dihydroxyundec-1'-enyl)-4,6-dihydroxybenzoic acid-10'-lactone steroid in 7 ml. of dry pyridine is cooled to 10° C. and treated with 0.4 ml. of thionyl chloride. The mixture is allowed to stand for 4 minutes at this temperature and then diluted with ice water. The solid which forms is collected by filtration, washed with water and dried. The solid thus obtained is refluxed in 10 ml. of collidine for 2 hours, cooled to room temperature, and diluted with a water-ether mixture. The ether layer is washed and dried and evaporated to give a mixture of 2 - (10'-hydroxyundec-1',5'-dienyl)-4,6-dihydroxybenzoic acid-10'-lactone and 2-(10'-hydroxyundec-1',6'-dienyl)-4,6-dihydroxybenzoic acid-10'-lactone which are separated by selective crystallization from ethanol.

EXAMPLE 10

A solution of 0.5 g. of 2-(6'-keto-10'-hydroxyundec-1'-enyl)-4,6-dihydroxybenzoic acid-10'-lactone in 25 ml. of dioxane is treated at −70° C. with 2 molar equivalents of sulfur tetrafluoride. The reaction vessel is sealed and the temperature permitted to attain 20° C. After being allowed to stand 20 hours, the reaction mixture is cooled, poured carefully into ice water, treated with an excess of sodium bicarbonate, and extracted with methylene chloride. The extract is washed with water to neutrality, dried and evaporated to dryness. The residue is chromatographed on alumina to yield 2-(6',6'-difluoro-10'-hydroxyundec-1'-enyl)-4,6-dihydroxybenzoic acid - 10' - lactone which is recrystallized from acetone:hexane.

EXAMPLE 11

To a solution of 1 g. of 1-(1'-carbethoxy-3'-methylprop-3'-yloxymethyl) - 2 - (1'-carbethoxypent-4'-enyl)-4,6-bistetrahydropyran-2'-yloxybenzene in 30 ml. of acetic acid is added 0.5 ml. of 2 N hydrochloric acid. The mixture is allowed to stand 5 hours at room temperature and then diluted with ice water and extracted with methylene chloride. The extracts are washed with water to neutrality, dried over sodium sulfate and evaporated to dryness to yield 1-(1'-carbethoxy-3'-methylprop-3'-yloxymethyl) - 2 - (1'-carbethoxypent-4'-enyl)-4,6-dihydroxybenzene which is recrystallized from acetone:hexane.

This latter compound is esterified as set forth in Example 4 hereof giving the corresponding 4,6-diesters thereof or it is etherified as also set forth in Example 4 hereof giving the other corresponding 4,6-diethers.

Subjection of the product compound of Example 1 to base hydrolysis as set forth in the last paragraph of Example 2 hereof gives 1-(4'-methyl-4'-yloxymethylbutanoic acid)-2-(hex-5'-enyloic acid)-4,6-bistetrahydropyran-2'-yloxybenzene which can be further modified as described above to give the corresponding 4,6-dihydroxy, -diester, and -diether derivatives of the biscarboxylic acid compounds.

Similarly, the product compound of Example 1 can be treated according to the various other elaboration procedures set forth hereinabove, thus giving the corresponding products thereof.

EXAMPLE 12

A mixture of 1 g. of ethyl 2-methyl-4,6-dihydroxybenzoate, 1 g. of p-toluenesulfonic acid monohydrate, 75 ml. of acetic acid and 50 ml. of acetic anhydride is allowed to stand at room temperature for 24 hours and then poured into water and stirred. This mixture is then extracted with successive portions of methylene chloride and these extracts are dried and evaporated to yield ethyl 2-methyl-4,6-diacetoxybenzoate, which is recrystallized from acetone:ether.

To a solution of one equivalent of chromium trioxide in 30 ml. of an acetic acid-acetic anhydride mixture (1:1 by weight) is added 1 g. of ethyl 2-methyl-4,6-diacetoxybenzoate, after standing for 3 hours at 0° C., the solid which forms is collected by filtration, washed with water, and recrystallized from methanol to yield ethyl 2-diacetoxymethyl-4,6-diacetoxybenzoate.

A mixture of 1 g. of ethyl 2-diacetoxymethyl-4,6-diacetoxybenzoate, 25 ml. of dry benzene, 5 ml. of ethylene glycol and 50 mg. of p-toluenesulfonic acid monohydrate is refluxed for 16 hours using a water separator. The reaction mixture is then washed with aqueous sodium bicarbonate solution and water, dried and evaporated to dryness to yield ethyl 2-ethylenedioxymethyl-4,6-diacetoxybenzoate, which is recrystallized from acetone:hexane.

Five milliliters of dihydropyran are added to a solution of 1 g. of ethyl 2-ethylenedioxymethyl-4,6-diacetoxybenzoate in 15 ml. of benzene. About 1 ml. is removed by distillation to remove moisture and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield ethyl 2-ethylenedioxymethyl-4,6-bistetrahydropyran-2'-yloxybenzoate, which is recrystallized from pentane.

A solution of 1 g. of lithium aluminum hydride and 2 g. of ethyl 2-ethylenedioxymethyl-4,6-b is tetrahydropyran-2'-yloxybenzoate in 150 ml. of tetrahydrofuran is stirred for 1 hour at room temperature. To the mixture is, thereafter, cautiously added 10 ml. of ethyl acetate and 7 ml. of water. The mixture is filtered and the solid thus collected is washed with hot ethyl acetate. The combined organic solutions are then evaporated to yield 2-methyl-4,6-bistetrahydropyran-2'-yloxyphenylcarbinol, which is further purified upon recrystallization from acetone: hexane.

Thereafter, the thus prepared compound is treated by the procedures as set forth in Examples 1 and 2, including the step of removing the ketal group by acid hydrolysis as described in the first paragraph of Example 11 to give the 2-aldehyde, to form identical products therefrom.

What is claimed is:

1. A compound selected from those of the formula:

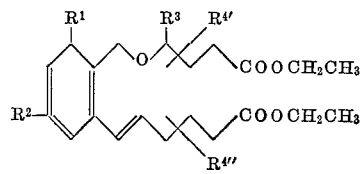

wherein each of $R^1$ and $R^2$ is hydrogen, hydroxy, lower alkoxy, halo, cyclopentyloxy, tetrahydrofuran-2-yloxy, tetrahydropyran-2-yloxy, hydrocarbon carboxylic acyl or acyloxy of less than 12 carbon atoms or, when taken together, 4,5-benzo;

$R^3$ is hydrogen or (lower) alkyl; and each of $R^{4'}$ and $R^{4''}$ is halo or the group $(C_nH_{2n})$—H in which $n$ has a value of from 0 to 6, provided that at least one of $R^{4'}$ and $R^{4''}$ is hydrogen, and the corresponding diacid derivatives thereof.

2. The compound of claim 1 wherein each of R1 and $R^2$ is tetrahydropyran-2-yloxy, $R^3$ is methyl, and each of $R^{4'}$ and $R^{4''}$ is hydrogen, and the corresponding diacid derivative thereof.

3. The compound of claim 1 wherein each of $R^1$ and $R^2$ is hydroxy, $R^3$ is methyl, and each of $R^{4'}$ and $R^{4''}$ is hydrogen, and the corresponding diacid derivative thereof.

No references cited.

JAMES A. PATTEN, Primary Examiner

U.S. Cl. X.R.

260—338, 340.7, 340.9, 343.2, 345.9, 347.4, 404.5, 468, 473, 476, 479, 482, 487, 521, 999

UNITED STATES PATENT OFFICE
CERTIFICATE OF CORRECTION

Patent No. 3,585,216          Dated June 15, 1971

Inventor(s) Alexander D. Cross, John H. Fried, Ian T. Harrison

It is certified that error appears in the above-identified patent and that said Letters Patent are hereby corrected as shown below:

Column 4, line 57, "2-oxacycloalkenobenzene" should read -- 1,2-oxacycloalkenobenzene --.
Column 6, line 54, "pyran-2'-yloxbenzoic" should read -- pyran-2'-yloxybenzoic --.
Column 6, line 75, "acids" should read -- acid --.
Column 7, line 4, "acidl" should read -- acid --.
Column 7, line 25, "dihydroyran" should read -- dihydropyran --.
Column 7, line 40, "similiary" should read -- similarly --.
Column 7, line 43, "construced" should read -- construed --.
Column 7, line 50, "mositure" should read -- moisture --.
Column 9, line 33, "Thereatfer" should read -- Thereafter --.
Column 9, line 54, "keta" should read -- keto --.
Column 9, line 69, "2-6'-keto-" should read -- 2-(6'-keto- --.
Column 10, line 1, "2-6'-" should read -- 2-(6'- --.
Column 10, line 5, "2-6'-keto" should read -- 2-(6'-keto- --.
Column 12, line 52, after "lactone" and before "in" delete -- steroid --.
Column 14, lines 28 to 50, Claim 1 should read as follows:
1. A compound selected from those of the formula:

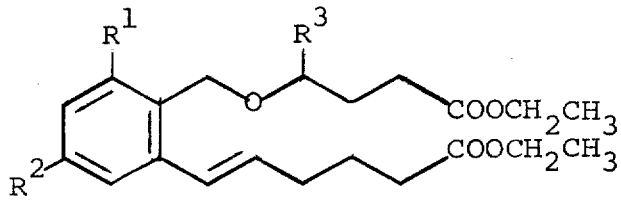

sheet 1 of 2

UNITED STATES PATENT OFFICE
CERTIFICATE OF CORRECTION

Patent No. 3,585,216             Dated June 15, 1971

Inventor(s) Alexander D. Cross, John H. Fried, Ian T. Harrison

It is certified that error appears in the above-identified patent and that said Letters Patent are hereby corrected as shown below:

wherein,
    each of $R^1$ and $R^2$ is hydrogen, hydroxy, lower alkoxy, halo, cyclopentyloxy, tetrahydrofuran-2-yloxy, tetrahydropyran-2-yloxy, hydrocarbon carboxylic acyl or acyloxy of less than 12 carbon atoms;
    $R^3$ is hydrogen or (lower) alkyl; and the corresponding diacid derivatives thereof.

UNITED STATES PATENT OFFICE
CERTIFICATE OF CORRECTION

PAGE - 3

Patent No. 3,585,216          Dated June 15, 1971

Inventor(s) Alexander D. Cross, John H. Fried, Ian T. Harrison

It is certified that error appears in the above-identified patent and that said Letters Patent are hereby corrected as shown below:

Column 14, lines 51 to 57, Claims 2 and 3, should read as follows:

2. The compound of Claim 1 wherein each of $R^1$ and $R^2$ is tetrahydropyran-2-yloxy, $R^3$ is methyl, and the corresponding diacid derivative thereof.

3. The compound of Claim 1 wherein each of $R^1$ and $R^2$ is hydroxy, $R^3$ is methyl, and the corresponding diacid derivative thereof.

Signed and sealed this 20th day of June 1972.

(SEAL)
Attest:

EDWARD M. FLETCHER, JR.          ROBERT GOTTSCHALK
Attesting Officer                   Commissioner of Patents